3,142,556
CONTROLLING VEGETATION WITH
PYRROLIDINYLCARBOXYLATES
Anton G. Weiss, Basel, Switzerland, assignor to Monsanto Company, a corporation of Delaware
No Drawing. Filed Sept. 18, 1961, Ser. No. 138,569
5 Claims. (Cl. 71—2.5)

This invention relates to an improved method of controlling or destroying vegetation employing certain pyrrolidinylcarboxylates.

It has been found that pyrrolidinylcarboxylates of the formula

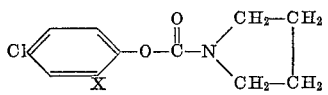

where X is hydrogen or chlorine possess exceptional phytotoxic properties and are effective in either contact or pre-emergence application. Accordingly, by applying the toxicant to the plant is meant any means whereby the toxicant is brought into contact with living plants which latter include germinating seedlings, as for example by application to the ground before the plants emerge or by direct application to the foliage. With the compounds it is possible to control or destroy weeds of both the narrowleaf and broadleaf type at low rates of application. Incorporation into the top soil generally improves performance markedly.

The pyrrolidinylcarboxylates of the above formula may be prepared by reacting pyrrolidine with phosgene to form the heretofore unknown pyrrolidinylcarbamoyl chloride and then reacting the latter with the appropriate phenol, in an inert solvent and in the presence of an acid acceptor. Suitable acid acceptors comprise sodium hydroxide, triethylamine and pyridine. Further details are set forth below:

To 3,000 ml. of benzene in a 12-liter flask equipped with a stirrer, condenser, dropping funnel and bubbler tube was added approximately 66 grams (0.66 mole) of phosgene as the temperature of the flask was raised to 65–70° C. There was then added an additional 594 grams (6.01 moles) of phosgene simultaneously with 426 grams (6.0 moles) of pyrrolidine in 1500 ml. of benzene. The temperature was held at 65–70° C. during the addition which required three hours. The reaction mixture was refluxed for fifteen minutes and then transferred to a heating mantle to remove benzene. Benzene was distilled at atmospheric pressure until the pot temperature reached 100° C. and then the remainder removed under pressure of about 60 mm. Hg. The crude product was then distilled through a 2 foot Vigreux column using a reflux head and aspirator vacuum. Pyrrolidinylcarbamoyl chloride was obtained in 71.3% theory yield distilling at 124–125° C./20 mm.

To a stirred mixture of 16.3 grams (0.1 mole) of 2,4-dichlorophenol in 70 ml. of acetone and 4 grams (0.1 mole) of sodium hydroxide was added in one portion 12.5 grams (0.1 mole) of pyrrolidinylcarbamoyl chloride prepared as described above. The mixture was refluxed for six hours and cooled to 25° C. To the stirred reaction mixture 350 ml. of water and 500 ml. of ethyl ether were added. The ether solution was separated and washed with water until the washings were neutral to litmus, dried over sodium sulfate and the ether removed by stripping at 90–95° C./14 mm. Hg. 2,4-dichlorophenyl pyrrolidinylcarboxylate (sometimes referred to hereinafter by code CP 23720) was obtained as an amber oil in 84.7% yield. Analysis gave 28.1% chlorine and 4.9% nitrogen as compared to 27.3% chlorine and 5.4% nitrogen calculated for $C_{11}H_{11}Cl_2NO_2$.

For preparation of p-chlorophenyl pyrrolidinylcarboxylate (sometimes referred to hereinafter by code CP 23175), substantially 3890 grams (30.15 moles) of p-chlorophenol was dissolved in 9700 ml. of acetone and charged into a reactor equipped with stirrer, condenser, dropping funnel, thermometer and suitable heating and cooling means. To this solution was added in small amounts 1210 grams (30.15 moles) of flake sodium hydroxide. Because of the heat evolved during this addition, cooling means were applied to the reactor. After the addition was complete the reactor was heated until the contents reached 50° C. and 4050 grams (30.15 moles) of pyrrolidinylcarbamoyl chloride prepared as described above added. Due to exothermic reaction, care is required in this addition to low boiling solvent medium at the specified temperature of operation. The temperature was maintained at 49–62° C. with a bath temperature of 45–48° C. Under these conditions there was a constant reflux during the addition which required about 45 minutes. The reaction mixture was digested for 4 hours at 55–62° C. and then cooled to room temperature. The oily product was separated from the acetone solution by adding warm water and separating the organic layer. The product was washed twice with water and volatile constituents removed by distillation. Final conditions were 60 minutes heating at less than 5 mm. pressure at a pot temperature of 80–90° C. It is usually a semi-solid but sometimes crystallizes with difficulty and may remain an oil for considerable periods. The pure product is a low melting solid. After drying the semi-solid on a porous plate and recrystallizing from ethyl alcohol it melted at 57–58° C. Analysis gave 6.2% nitrogen and 16.4% chlorine as compared to 6.2% nitrogen and 15.7% chlorine calculated for $C_{11}H_{12}ClNO_2$.

As illustrative of pre-emergent herbicidal activity, an aluminum pan, perforated on the bottom, was filled with a standard soil preparation to a depth of ⅜" from the pan top. A counted number of seeds of various grasses and broadleaf plants were scattered on the soil surface. The seeds were covered with soil to the pan top. The planted pans were placed in an exhaust hood and sprayed with a relatively high volume of volatile organic solvent containing 2,4-dichlorophenyl pyrrolidinylcarboxylate. The spray volume was kept constant and the test chemical applied at the rate of 25 pounds per acre. The prepared pans were next placed in a greenhouse bench containing one-half inch of water and allowed to take up water from below until ⅔ of the top surface showed evidence of moisture. The pans were removed and placed in the greenhouse on a moist sand bench.

The seeds normally germinated and emerged in three to five days, and observations on the germination inhibition were made on the 14th day after planting. The number of seeds emerging times an injury or vigor factor gave in indication of the effectiveness of the compound. The injury factor took into consideration any plants not expected to survive and evened irregularities of ratings on seeds which varied in percent germination. Thus, ratings were based on the number of plants which emerged and would survive as observed two weeks after planting. Herbicidal ratings were assigned by means of the following conversion scale:

| Percent emergence | Phytotoxicity rating |
|---|---|
| 0-25% | 3 or severe. |
| 26-50% | 2 or moderate. |
| 51-75% | 1 or slight. |
| 76-100% | 0 or none. |

The plants employed in the pre-emergence application are designated by letter in Table I. The plants corresponding to the letters are as follows:

A—morning glory  
B—wild oats  
C—brome grass  
D—rye grass  
E—mustard (radish)  
F—sugar beet  
G—foxtail  
H—crab grass  
J—pigweed  
K—soybean  
L—wild buckwheat  
M—tomato  
N—sorghum The following phytotoxicity ratings were observed:

TABLE I
*Phytotoxicity Rating*

| A | B | C | D | E | F | G | H | J | K | L | M | N |
|---|---|---|---|---|---|---|---|---|---|---|---|---|
| 0 | 3 | 3 | 3 | 3 | 3 | 3 | 3 | 3 | 3 | 3 | 3 | 3 |

As illustrative of contact herbicidal properties possessed by 2,4-dichlorophenyl pyrrolidinylcarboxylate, a flat containing two-week old plants of the grasses and broadleaf plants described above was sprayed with 6 cc. of a 0.5% concentration spray of the carboxylate. This amount for the test area corresponded to a rate of approximately 9 pounds per acre. After 14 days the plants were observed and all injury noted. Results of observations at this time are given in Table II.

TABLE II

Test plant:                     Herbicidal rating  
    Morning glory _____ 3  
    Wild oat _____ 4  
    Brome grass _____ 4  
    Rye grass _____ 4  
    Radish _____ 3  
    Sugar beets _____ 4  
    Foxtail _____ 4  
    Crab grass _____ 4  
    Pigweed _____ 4  
    Soybean _____ 3  
    Wild buckwheat _____ 4  
    Tomato _____ 4  
    Sorghum _____ 2

In Table II, 2 indicates moderate injury, 3 severe injury and 4 indicates that the plants were dead at the time of observation. In similar tests 2,4-dichlorophenyl piperidinocarboxylate was only slightly phytotoxic to broadleaf plants and moderately toxic to grass in view of which observations on individual species were not recorded.

To illustrate soil incorporation in preplanting treatment, pans were prepared to seed planting stage as before. 2,4-dichlorophenyl pyrrolidinylcarboxylate was sprayed on, and thoroughly mixed with, the ⅜″ cover layer of soil (450–500 grams of soil). After covering the seeed with treated soil, pans were placed in the greenhouse bench as indicated in the pre-emergence application. Phytotoxicity ratings at 1 pound and at ½ pound per acre are recorded in Table III. Identical tests with 2,4-dichlorophenyl 1-piperidinecarboxylate (referred to as CP 23769) are also recorded.

TABLE III

| | Herbicide ratings | | | |
|---|---|---|---|---|
| Test species | 1 pound per acre | | ½ pound per acre | |
| | CP 23720 | CP 23769 | CP 23720 | CP 23769 |
| Morning glory | 0 | 0 | 3 | 0 |
| Wild oat | 3 | 0 | 2 | 0 |
| Brome grass | 3 | 0 | 0 | 0 |
| Rye grass | 3 | 0 | 3 | 0 |
| Radish | 0 | 0 | 0 | 0 |
| Sugar beets | 2 | 0 | 3 | 0 |
| Foxtail | 3 | 0 | 3 | 0 |
| Crab grass | 3 | 0 | 3 | 0 |
| Pigweed | 3 | 0 | 2 | 0 |
| Soybean | 0 | 0 | 0 | 0 |
| Wild buckwheat | 3 | 0 | 0 | 0 |
| Tomato | 3 | 0 | 0 | 0 |
| Sorghum | 3 | 0 | 0 | 0 | p-Chlorophenyl pyrrolidinylcarboxylate also possesses exceptional phytotoxic properties. For example, it is at least five times as effective as the known p-chlorophenyl 1-piperidine-carboxylate. Also, the o-chlorophenyl and m-chlorophenyl pyrrolidinylcarboxylates are far less active. Although p-chlorophenyl pyrrolidinyl carboxylate possesses general herbicidal activity when used in foilage contact sprays and dusts, it is particularly effective as a pre-emergent herbicide. For such use it is applied in spray form to soil containing germinating seedlings of undesired vegetation.

As illustrative of pre-emergent herbicidal activity, pans were prepared as before and seeded with a counted number of seeds of wild oats, brome grass, rye grass, foxtail, crab grass, sorghum, sugar beet, pigweed, wild buckwheat and tomato. The results at rates of 5 and 2½ pounds per acre are shown in Table IV where the total number of seedlings surviving from the aforesaid ten species planted is recorded as compared to those from identical tests with p-chlorophenyl 1-piperidinecarboxylate (referred to as CP 23770).

TABLE IV

| Toxicant | Application rate, lbs./acre | Surviving seedlings, all species |
|---|---|---|
| CP 23175 | 5 | 0 |
| CP 23770 | 5 | 54 |
| CP 23175 | 2.5 | 8 |
| CP 23770 | 2.5 | 93 |

To illustrate soil incorporation in preplanting treatment, pans were prepared to seed planting stage as before. p-Chlorophenyl pyrrolidinylcarboxylate was sprayed on, and thoroughly mixed with, the ⅜″ cover layer of soil. After covering the seed with the treated soil, the pans were placed in the greenhouse bench as indicated in the pre-emergence application. The following table records the results at 1 pound per acre and at 5 pounds per acre again compared to the results from identical tests with p-chlorophenyl piperidinylcarboxylate. Results were based on the number of plants which emerged and would survive as observed two weeks after planting. The number of plants emerging from the seeds were counted and multiplied by an injury factor. In the case of crab grass and pigweed the seeds being very tiny, were measured by volume. The volume used was that containing 20 to 30 seeds on the average.

TABLE V

| Test species | Number of seeds planted | Surviving seedlings | | | |
|---|---|---|---|---|---|
| | | 1 pound per acre | | 5 pounds per acre | |
| | | CP 23175 | CP 23770 | CP 23175 | CP 23770 |
| Wild oat | 20 | 1.2 | 7 | 0 | 10.0 |
| Brome grass | 10 | .9 | 3 | 0 | 3.6 |
| Rye grass | 20 | .5 | 17 | 0 | 15.5 |
| Wild buckwheat | 20 | 2 | 3 | 0 | 1 |
| Sugar beet | 10 | 8.2 | 1 | 0 | 3.6 |
| Foxtail | 20 | 0 | 10 | 0 | 5.5 |
| Crab grass | 20-30 | 0 | 27 | 0 | 20 |
| Pigweed | 20-30 | 0 | 7 | 0 | 10 |
| Tomato | 5 | 0 | 4 | 0 | 2 |
| Sorghum | 10 | 5.5 | 3 | 0 | 4.5 |
| Total | | 18.3 | 82 | 0 | 76.6 |

Similar tests were made comparing o-chlorophenyl pyrrolidinylcarboxylate (referred to as CP 24413) with p-chlorophenyl pyrrolidinylcarboxylate. Observations noted at a dosage of 1 pound per acre are summarized in Table VI.

TABLE VI

| Test species | Number of seeds planted | Surviving seedlings | |
|---|---|---|---|
| | | CP 23175 | CP 24413 |
| Wild oat | 20 | 4 | 8.5 |
| Brome grass | 10 | 1.4 | 4 |
| Rye grass | 20 | 7.2 | 18 |
| Buckwheat | 5 | 3 | 4 |
| Sugar beet | 10 | 9 | 13 |
| Foxtail | 20 | 0.5 | 11 |
| Crab grass | 20-30 | 0.5 | 23 |
| Pigweed | 20-30 | 4 | 8 |
| Tomato | 5 | 4 | 4.5 |
| Sorghum | 10 | 7 | 3.5 |
| Total | | 40.6 | 97.5 |

From the data in the above tables it will be noted that p-chlorophenyl pyrrolidinylcarboxylate has unusual pre-emergence herbicidal activity and that similar properties are not shared by the ortho isomer.

As illustrative of the contact herbicidal properties possessed by p-chlorophenyl pyrrolidinylcarboxylate, a flat containing two-week old plants of the grasses and broadleaf plants described above was sprayed with 6 cc. of a 0.5% concentration spray of the carboxylate. After 14 days the plants were observed and all injury noted. Observations at this time showed the sugar beet, pigweed and tomato plants severely injured while the wild buckwheat, foxtail and crab grass plants were moderately injured.

Although the pyrrolidinylcarboxylates are insoluble in water, they may be dispersed therein and applied as aqueous sprays. Petroleum fractions make satisfactory, economical herbicidal adjuvants and readily lend themselves to emulsification in water where that is desired. Whether applied in conjunction with a carrier or not, admixture with a small amount of an organic surface active agent capable of lowering the surface tension of water is desirable for field application. Examples of surface active agents variously known as dispersing agents, wetting agents or emulsifying agents comprise soft or hard potassium soaps, morpholine or dimethylamine oleate, sulfonated fish, castor and petroleum oils, sodium salt of lignin sulfonic acid, alkylated aromatic sodium sulfonates, such as decylbenzene sodium sulfonate, dodecylbenzene sodium sulfonate, butyl or other amine salt of decyl or dodecyl benzene sulfonic acid, sodium lauryl sulfate, disodium monolauryl phosphate, ethylene oxide condensation products of alkyl phenols, as for example octyl phenol, ethylene oxide condensation products of tall oil, ethylene oxide condensation products of higher alcohols or higher mercaptans. Mixtures of two or more surface active agents are also feasible. Generally, the surface active agent will comprise only a small proportion of the composition, say 0.1–15% by weight of the toxicant. Solution of the toxicant in organic solvents containing small amounts of surface active agent provide versatile herbicidal compositions useful either for direct application to foliage and soil or for preparing aqueous sprays. A suitable formulation comprises 45 parts by weight heavy aromatic naphtha, 5 parts by weight organic surface active agent and 50 parts by weight of carboxylate.

The formulation of dry compositions for application as dusts or for further dilution with liquid carrier is readily accomplished by mixing the carboxylate with a finely divided solid carrier. The latter will usually be in major proportions. Suitable carriers comprise talc, clay, pyrophyllite, silica, fuller's earth, diatomaceous earth and flours such as walnut shell, wheat, soybean, and cottonseed flours. Magnesium or calcium carbonate and calcium phosphate are suitable solid carriers. Adsorption on inert granules such as granular forms of fuller's earth provide effective forms more convenient to apply and use than dusts.

It is intended to cover all changes and modifications of the examples of the invention herein chosen for purposes of disclosure which do not constitute departures from the spirit and scope of the invention.

This application is a continuation-in-part of applications Serial No. 39,428, filed June 29, 1960, and Serial No. 39,448, filed June 29, 1960, both now abandoned.

What is claimed is:

1. The method of controlling undesired broadleaf plants and grasses which comprises applying thereto a phytotoxic amount of a compound having the structure

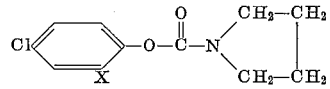

where X is selected from a group consisting of hydrogen and chlorine.

2. The method of controlling undesired broadleaf plants and grasses which comprises applying thereto a phytotoxic amount of p-chlorophenyl pyrrolidinylcarboxylate.

3. The method of controlling undesired broadleaf plants and grasses which comprises applying thereto a phytotoxic amount of 2,4-dichlorophenyl pyrrolidinylcarboxylate.

4. The method of claim 2 in which the p-chlorophenyl pyrrolidinylcarboxylate is applied to the soil medium as a pre-emergence herbicide.

5. The method of claim 3 in which the 2,4-dichlorophenyl pyrrolidinylcarboxylate is applied to the soil medium as a pre-emergence herbicide.

References Cited in the file of this patent

UNITED STATES PATENTS 2,812,247    Gysin et al. _____ Nov. 5, 1957